United States Patent
Breed et al.

(10) Patent No.: US 6,661,740 B1
(45) Date of Patent: Dec. 9, 2003

(54) MULTI-STATIC, OPPORTUNE-SOURCE-EXPLOITING, PASSIVE SONAR PROCESSING

(76) Inventors: Ben R. Breed, 4755 W. Fitzhugh Rd., Dripping Springs, TX (US) 78620; William Lee Mahood, 2116 Twin Mill La., Oakton, VA (US) 22124

( * ) Notice: Subject to any disclaimer, the term of this patent is extended or adjusted under 35 U.S.C. 154(b) by 0 days.

(21) Appl. No.: 10/160,995

(22) Filed: Jun. 3, 2002

(51) Int. Cl.$^7$ .............................. G01S 3/802
(52) U.S. Cl. ...................................... 367/124
(58) Field of Search ............................ 367/124, 125, 367/131; 342/108, 159, 449

(56) References Cited

U.S. PATENT DOCUMENTS

| | | | |
|---|---|---|---|
| 3,579,180 A | * | 5/1971 | Taddeo ........................ 367/125 |
| 4,198,704 A | * | 4/1980 | Munson ....................... 367/125 |
| 4,349,915 A | | 9/1982 | Costas |
| 4,438,439 A | * | 3/1984 | Shreve ........................ 342/449 |
| 4,480,322 A | * | 10/1984 | Orieux et al. ................ 367/125 |
| 4,604,733 A | | 8/1986 | Brown et al. |
| 4,746,924 A | * | 5/1988 | Lightfoot .................... 342/159 |
| 4,994,809 A | | 2/1991 | Yung et al. |
| 5,008,630 A | | 4/1991 | Reimel |
| 5,216,815 A | | 6/1993 | Bessacini |
| 5,231,609 A | | 7/1993 | Gaer |
| 5,410,519 A | | 4/1995 | Hall et al. |
| 5,425,000 A | * | 6/1995 | Reed et al. .................. 367/131 |
| 5,432,753 A | | 7/1995 | Maranda et al. |
| 5,777,949 A | | 7/1998 | MacLeod |
| 5,877,998 A | | 3/1999 | Aidala |
| 5,914,912 A | | 6/1999 | Yang |
| 5,930,201 A | | 7/1999 | Cray |
| 6,222,479 B1 | | 4/2001 | Honigsbaum |

OTHER PUBLICATIONS

Acoustic imaging using ambient noise: Some theory and simulation results by John R. Potter (J. Acoust. Soc. Am. 95 (1), Jan. 1994).

Ambient noise imaging in warm shallow seas; second–order moment and model–based imaging algorithms by John R. Poter and Mandar Chitre (J. Acoust. Soc. Am. 106 (6), Dec. 1999).

Imaging in the ocean with ambient noise: the ORB experiments by Chad L. Epifanio, John R. Potter, Grant B. Deane, Mark L. Readhead and Michael J. Buckingham (J. Acoust. Soc. Am. 106 (6). Dec. 1999).

* cited by examiner

Primary Examiner—Ian J. Lobo

(57) ABSTRACT

A multistatic passive sonar is disclosed having a time-aligned source combiner, that exploits the cross-correlation between a target beam and all other beams to detect and measure the range of a target. This combiner performs long-term cross-correlation between the target beam and each individual source beam, and then aggregates the individual correlation results, time aligned based on the scenario geometry, and averaged to enhance the composite signal-to-noise ratio of the range measurement. In doing so, innocuous acoustic sources may be opportunistically exploited as if the array were part of a multi-static, active (e.g., sonar) system.

12 Claims, 3 Drawing Sheets

MULTI-STATIC, OPPORTUNE-SOURCE-EXPLOITING, PASSIVE SONAR PROCESSING

GOVERNMENT RIGHTS

The government has certain rights in this invention pursuant to Contract No. N00024-00-C-4088 awarded by the Department of the Navy.

BACKGROUND OF THE INVENTION

1. Field of the Invention

The invention in general relates to navigation systems, and more particularly to an acoustic system for determining bearing and range to objects via passive sensors.

2. Background

A variety of methods and systems for detecting and tracking objects using acoustic information are well known in the art. These systems include both active and passive approaches. While active systems allow for rapid determination of both range and bearing to objects, passive systems can be more desirable where, for example, there are concerns about remaining undetected (e.g., military applications) or in minimizing the acoustic energy being generated (e.g., when in proximity to sea animals sensitive to sonar).

Most prior art passive systems have employed approaches that use the acoustic energy radiated from an object to determine its position. This process may involve extra processing or maneuvering, as in the case of target motion analysis (see, e.g., U.S. Pat. No. 5,216,815 to Bessacini) or Ekelund ranging (see, e.g., U.S. Pat. No. 5,877,998 to Aidala et al.). Additional information such as frequency parameters of the radiating object have also been considered (see, e.g., U.S. Pat. No. 5,432,753 to Maranda). However, in all these cases it is the acoustic energy from the object of interest that is measured, and the energy from other objects is either ignored or filtered.

A different approach for passive detection was suggested by John Potter in his article, "Acoustic Imaging Using Ambient Noise." This article describes the results of a computer simulation of modeling reflectors (e.g., a spherical shape) scattering ambient acoustic energy (e.g., isotropic and partial anisotropic noise). Its conclusions were that near-perfect reflectors in isotropic noise cannot be imaged, except in the near-field, but that in typical oceanic environments there should be considerable anisotropy such that imaging is possible. In conducting their simulation several simplifying assumptions were made regarding the model for scattered pressure amplitude of a source wave, and the ranges were taken as givens. In other words, while this article pointed to the possibility of applications in which scattering objects might be imaged, it did not describe a working solution for how to carry out that imaging. Epifanio et al., and Potter and Chitre more recently improved on this by showing how images could be formed via intensity mapping of a region at various frequencies. However, the practical range for their acoustic imaging was limited; Epifanio et al. imaging fixed objects between 13 m and 38 m. Thus, to date the systems based on this acoustic imaging concept only address short range, near-field imaging applications, and have not attempted to address issues like range determination.

SUMMARY

One embodiment of the invention includes a multistatic time-aligned source combiner, that exploits the cross-correlation between a target beam and all other beams to detect and measure the range of the target. This combiner performs long-term cross-correlation between the target beam and each individual source beam, and then aggregates the individual correlation results, time aligned based on the scenario geometry, and averaged to enhance the composite signal-to-noise ratio of the range measurement. In doing so, this embodiment exploits innocuous acoustic sources opportunistically as if the array were part of a multi-static, active (e.g., sonar) system.

A partial listing of benefits that may be realized from this embodiment include: high-resolution target location can be obtained using passive acoustic listening arrays; target ranges may be determined without emitting sounds that might compromise the presence or location host vessel or injure marine life; conventional signal detection methods may be enhanced synergistically with time-aligned source combining; and diverse acoustic sources, including discrete/opportunistic and natural/distributed sources, may be exploited in determining location information.

DRAWINGS

The invention may be more readily appreciated from the following detailed description, when read in conjunction with the accompanying drawings, in which.

DETAILED DESCRIPTION

The present invention has found a way to exploit the natural and opportunistic acoustic radiation in most environments to detect and localize targets. Unlike earlier acoustic imaging approaches, it can be applied at longer ranges, as would be desirable for many sonar detection and localization applications. The presently preferred embodiment achieves this in part because it includes the use of high signal processing gains obtained from long-term cross-correlation techniques.

Figure 1:
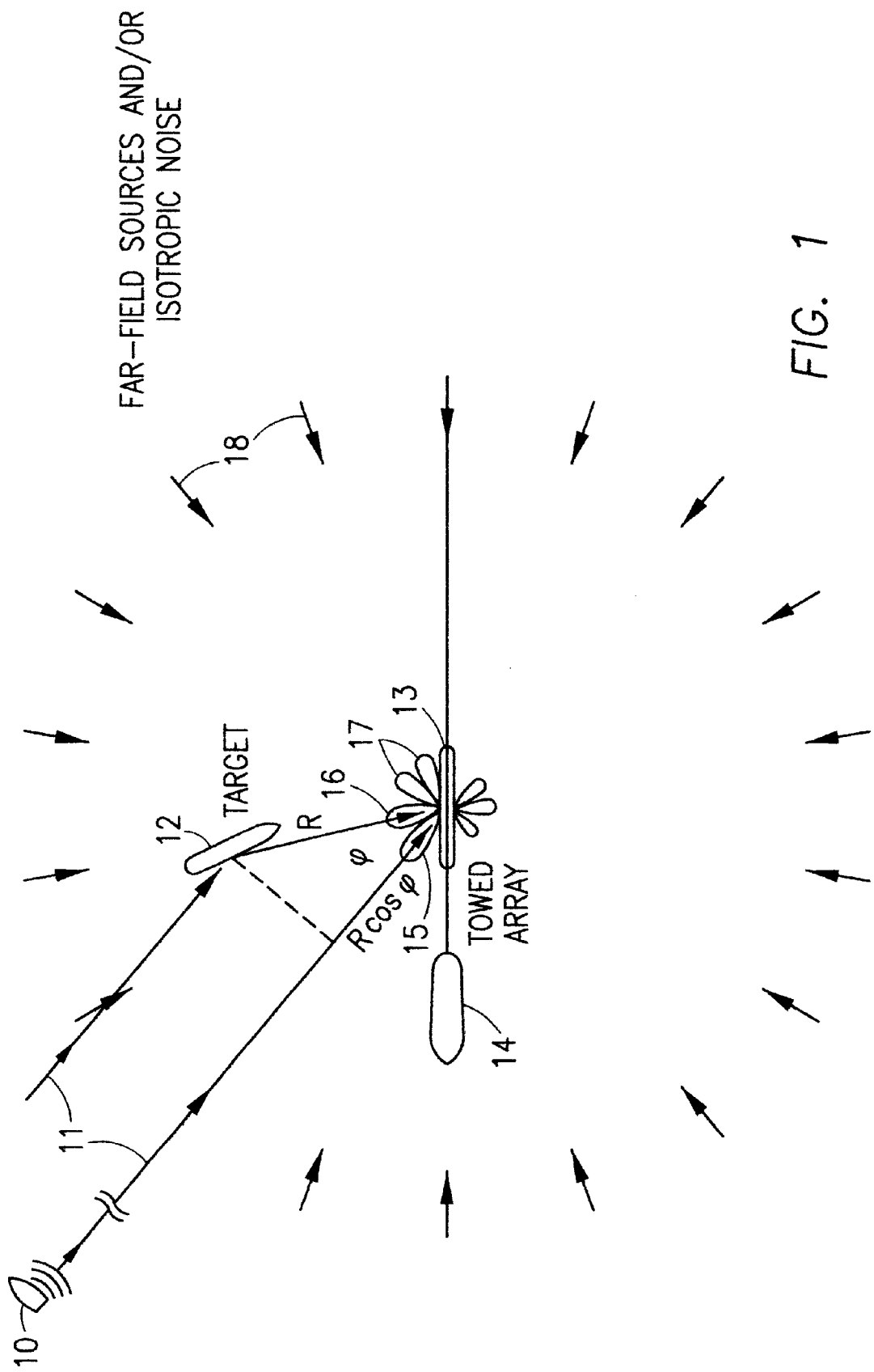
FIG. 1 illustrates a multistatic system involving a towed array sonar platform.

This embodiment of the invention may be better understood by reference to FIG. 1. Many noise sources are located in the far-field. These sources may be either opportunistic or innocuous, and may include those having known positions (such as noise-generating coastal facility, navigation aid, etc.), reasonably predictable positions (e.g., commercial shipping traffic with constant speed and heading), or other unknown sources (e.g., wave generated noise, biologics, and other innocuous sounds).

If a source is from a substantially known direction, it is possible to compute the range to a target from the difference in arrival time between the source's direct signal and its echo signal from the target. Thus, in the illustrated case of FIG. 1 a far-field source 10 generates acoustic signal 11, one path of which travels directly to the detection device (towed array 13) and is detected on beam 15. Acoustic signal 11 is also reflected via target 12, which combines with other signals from target 12 to form a target signal which is detected on beam 16. The reflected signal may be recovered through correlating the target signal with the source signal, yielding the time difference between the direct path signal and the reflected signal. If the time difference is known, then the distance R to target 12 can be readily determined as follows:

$$R=(v\tau_b)/(1-\cos\phi_b) \quad \text{(Eq. 1)}$$

where $\tau_b$ is the time difference of arrival determined by correlating the two beams, v is the sound velocity, and $\phi_b$ is the relative angle between the direct beam is and the target beam.

If the correlation content of a given beam or the energy reflected from the target are not sufficiently high, then the correlation result will be buried in the incoherent correlation noise, even with long-term cross-correlation (time-bandwidthed). However, even if the correlation result of a given beam has too low of a SNR (signal-to-noise ratio), by using the correlation results from multiple beams 17 with acoustic information from multiple sources 18, a composite signal with sufficient SNR can be recovered.

Figure 2:
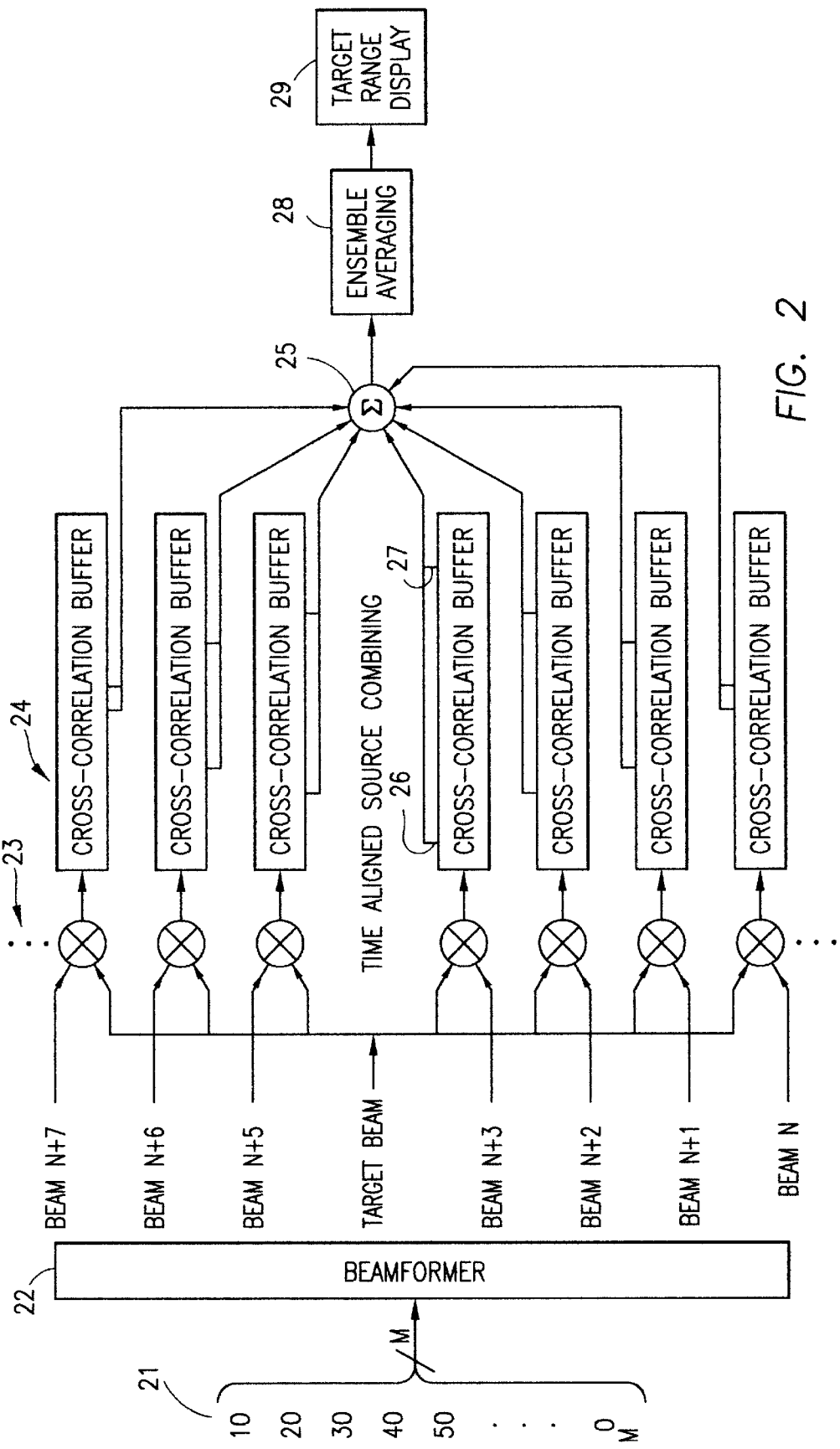
FIG. 2 is a schematic diagram of a multistatic sonar system illustrating an embodiment of the invention.

Turning now to FIG. 2, the preferred embodiment for processing this multistatic source information is illustrated. Acoustic energy is first detected via plural sound transducers 21 of the array 13, and processed via beamformer 22 into plural beam channels. One of these beams is selected as the target beam, and the remaining beams are cross-correlated with the target beam via correlation function 23. The resulting cross-correlated signals are then stored in a time-series buffer 24 for further processing.

If any signal displays a sufficiently strong cross-correlation, then information about the time difference between the two beams forming the cross-correlated signal could be used to readily determine a target range. However, even in the absence of a single strong enough signal, if all the cross-correlation signals are appropriately combined a sufficiently strong signal can be recovered.

In order to combine the signals, they are first time-aligned. The cross-correlation result between a given source beam and the target beam is displaced in time according to the geometric relationship of the sound source, the reflecting target, the receiving acoustic array and the intervening sound propagation conditions. The results are combined by super-imposing each of the individual, time-aligned correlation results For the general case of a receiving array (e.g., for a 3-dimensional arrangement of acoustic transducers) 21, the beamformer 22 is expected to form a plurality of radial beams that subtend unique solid angles relative to the acoustic center of the array. There is a single geometric solution for each source-beam-to-target-beam pair and a unique time displacement is computed to be applied to each cross-correlation result.

For the special case of a linear array of acoustic transducers, the beamformer forms a plurality of radial beams where each beam subtends a torus about the axis of the array. In a practical sense, the linear array has left-right ambiguity in the geometric solutions for the horizontal plane. Separate time displacements must be applied to the cross-correlation results to accommodate sound sources that are located to the left and to the right. Thus, there are two time displacements, $\tau_{bl}$ and $\tau_{br}$, where a given beam will have correlation between the beam and the target beam. In the case of FIG. 2, taps 26 and 27 illustrate through their different positioning how the cross-correlated signal is output from the buffer 24 at two different time-displaced values to combiner 25. Both of these are included in the time-aligned, correlation result.

For the case where the signal of a distant, far-field source impinges upon the target 12 and the array 13 relative time displacement of the of the cross-correlation result between the source-target beam pair is computed approximately as follows: The aggregation of cross-correlation results may be accomplished by summing the correlation sequences with a time alignment that is consistent with range in the target direction, as in, Eq. 2:

$$\tau_b=(R/v)(1-\cos\phi_b) \quad \text{(Eq. 2)}$$

The index into the cross-correlation sequence stored in the buffers 24 is computed by rounding the result of $\tau_b f_s$ where $f_s$ is the sampling rate of the acoustic data.

One skilled in the art will appreciate that there are many factors that must be considered in solving the scenario geometries and in the computation of time displacements. Solutions more rigorous than described here are used to treat factors such as: near-field sources, the acoustic propagation environment, the relative depth of the target, a priori knowledge of target and/or source locations, bathymetry data, and other factors.

By bringing these cross-correlation results into time alignment, according to the geometries, the cross-correlation results reinforce one another. This summation over the different beams (except for the auto-correlation of the target beam) produces a signal-to-noise enhancement proportional to the number of beams formed in the array, and the content of opportunistic sources found in the environment.

This process is repeated for a plurality of ranges, adjusting the time-alignment factors (e.g., taps 26 and 27) for each beam-pair as affected by range. The combined output for the target beam for all ranges is thus determined.

To further enhance the signal recovery relative to the noise, the process is repeated again and an ensemble average of the output values is determined. One skilled in the art will know how to select an appropriate implementation of ensemble averaging for their desired application. In the illustrated case, an exponential decay algorithm was used of the form:

$$s_t = (1-\alpha)s_{t-1} + \alpha\sum_b (\overline{a_t}[t] \otimes \overline{a_b}[t+\tau_b]) \quad \text{(Eq. 3)}$$

where $\alpha$ is the weighting factor for ensemble averaging.

With respect to the cross-correlation used, the preferred embodiment accomplishes cross-correlation in the frequency domain. A forward FFT is computed for each beam, including the target beam. Cross-correlation is accomplished by taking the product of the of the beam spectrum with the target spectrum and taking the inverse FFT:

$$a_b \bigotimes a_t = FFT^{-1}(H_b \times H_t) \tag{Eq. 4}$$

There are limits to the length of sequences included in a cross-correlation computation. For example, these limits may occur because of relative motion between the target and the towed array. As the towed array moves through the water, there are changes in multi-path propagation that will impact the use of long sequences in cross-correlation. In idealistic simulations better results are obtained using very long sequences, but in the preferred approach the correlated sequence was limited to about 20 seconds of data. To accommodate de-correlation at the ends of the sequences, overlapping segments were used in the correlation process.

Those skilled in the art will appreciate that a variety of signal detection means, beamformers, and cross-correlation algorithms may be used to arrive at useful cross-correlated signals. While none is necessarily preferred in the context of the invention, the selected system must be able to resolve angular difference between the beams in order to time align the signals.

Figure 3:
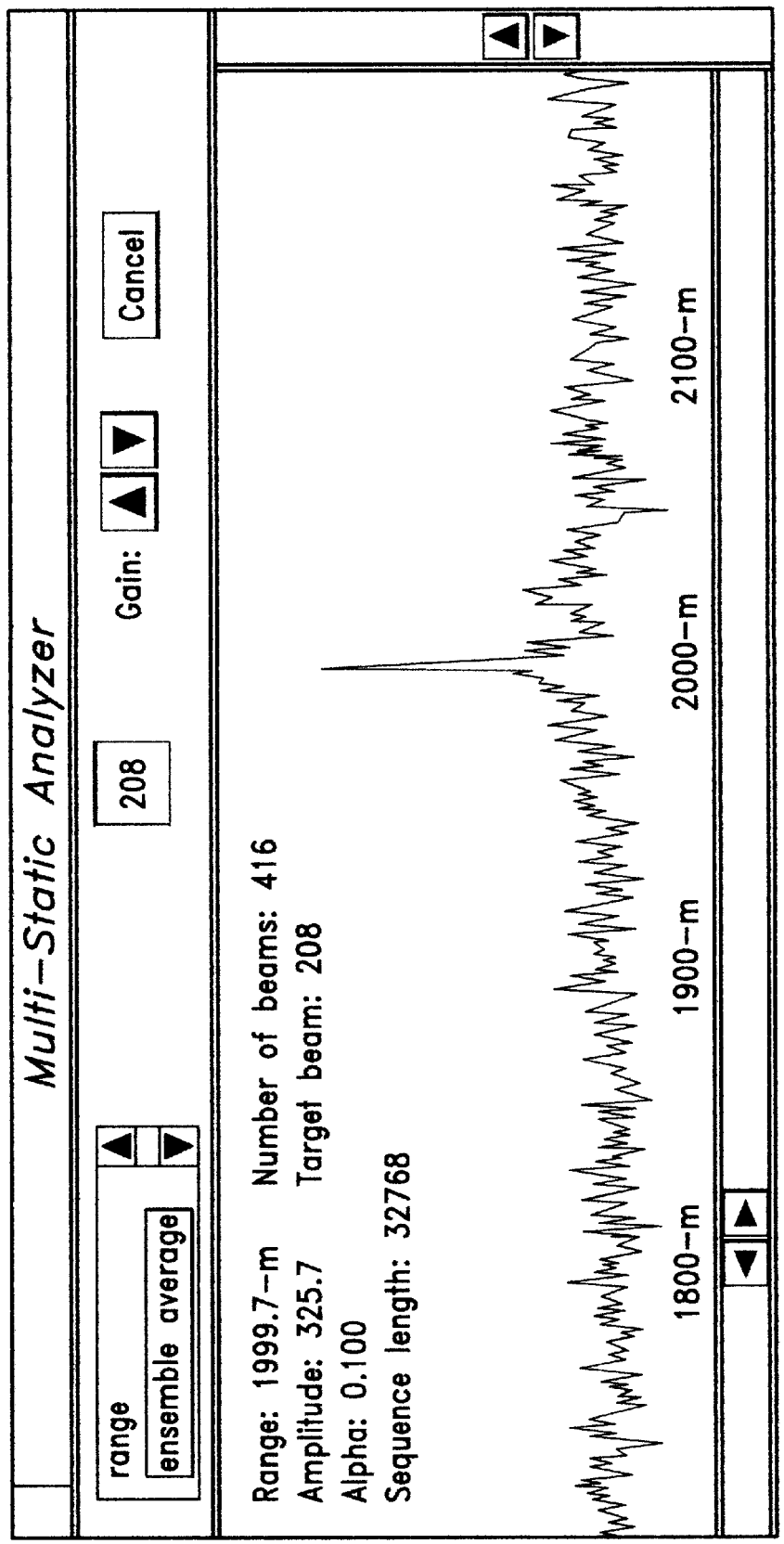
FIG. 3 illustrates a graphical output window showing detection of a target.

The ensemble averaged results may be displayed according to any convenient format 29. In the illustrated case of FIG. 3, a graphical display, which shows the ensemble averaging results, is the primary display for the processed data. FIG. 3 illustrates hypothetical results of a linear, towed array, showing a target located abeam of the array at a range of 2000 meters. The input data from the array is beamformed into 416 beams distributed uniformly in cosine space, with a simulated reflecting target located on beam 208. Gaussian, white noise was used to simulate an experimental environment where each beam receives a uniform mixture of coherent (correlatable) noise and incoherent noise. In this case, the coherent (correlatable) content of each peripheral beam is set at 50% (0.5) of the total beam amplitude. The effective "sonar" cross-section of the target is at 2000 m$^2$, and the propagation velocity of sound in water is 1500 m/s. Cross-correlation is performed between the target beam and every other beam. The cross-correlation is done using frame sequences of 65,536 samples; i.e., using 64K FFTs. This is a relatively long-term correlation spanning about 21 seconds of data, and successive cross-correlations are done with a 50% overlap of the frames. The weighting factor $\alpha$ is used in ensemble averaging is 0.1. FIG. 3 illustrates an example where there is a peak in the ensemble averaged result occurring at a measured range of 2000 meters.

The source combining technique of the preferred embodiment may be dependent upon one finding a cross-correlation between a beam pointed in the direction of a noise source and the beam pointed in the direction of the target. Computing the cross-correlation between one source direction and the target is essentially a bi-static situation. The beam thus pointed at the acoustic source seeks to use the coherent portion of the sound/noise as a replica for matched-filter detection of the same signal reflected of the target—a sort of "ping stealing" as might be used in bi-static sonar. In the case of ping stealing, the direct blast is quite strong and readily separated from noise; it is a clean replica to use in matched filter detection of energy reflected from the target. However, far-field source combining may not able to extract a "clean replica" from the beam pointed at the source. Instead, one may have to use the entire signal received by the beam as a replica. Similarly, the signal reflected off of the target has a copy of the source buried among energy reflected from all other sources and the background noise of that beam. In processing the two beams, the cross-correlation function operates to detect the coherent portion of the two signals, both masked by incoherent noise. One skilled in the art will also appreciate how target detection may be enhanced relative to the noise of the process by using long-term cross correlation. In the illustrated case of FIG. 3, signal sequences of 21-seconds were cross correlated to maximize the amplitude of the detection. This is a relatively long sequence as, e.g., most active sonar pings used today are on the order of 2 to 10 seconds. Using a long sequence enhances the result, but at the same time the result is more sensitive to relative motion between the target and the array.

As discussed above, the preferred embodiment also uses ensemble averaging to enhance the detectability of the target over a longer period of time. The present ensemble averaging algorithm uses an exponential decay process sliding over successive results; however, block summation averaging could yield better results in some applications.

While the foregoing constitute certain preferred and alternative embodiments of the present invention, it is to be understood that the invention is not limited thereto and that in light of the present disclosure, various other embodiments will be apparent to persons skilled in the art. Thus, for example, while the preferred embodiment is illustrated in connection with marine environments, the invention may be used in any acoustic environment, including but not limited to air environments where, e.g., darkness, fog or smoke obscure visual means. Further, while the preferred embodiment has been described in terms of hardware circuitry, those skilled in the art will recognize that everything except the initial acoustic detector may be implemented in either hardware, software, or some combination of hardware and appropriately configured programs and processors implementing the described functionality, depending on the design choices that a skilled artisan may make. Accordingly, it is to be recognized that changes can be made without departing from the scope of the invention as particularly pointed out and distinctly claimed in the appended claims which shall be construed to encompass all legal equivalents thereof.

What is claimed is:

1. A method for passively locating an object using acoustic signals comprising:

receiving a target beam including acoustic information from multistatic sources reflected by a target, receiving said acoustic information directly from plural source beams; and processing the target and plural source beams to determine location information including a range of the target.

2. The method of claim 1, wherein said acoustic information comprises first and second signals respectively received directly on first and second beams of said plural source beams, and the step of processing comprises:

a. cross-correlating the target beam with each of the first and second signal to form first and second cross-correlated outputs, respectively;

b. time-aligning and combining the first and second cross-correlated outputs to form a combined source signal; and c. determining said range based on the combined source signal.

3. The method of claim 1, wherein said acoustic information comprises first and second signals respectively received directly on first and second beams of said plural source beams, and the step of processing comprises:

a. cross-correlating the target beam with each of the first and second signal to form first and second cross-correlated outputs, respectively;

b. time-aligning and combining the first and second cross-correlated outputs to form a combined source signal; and c. repeating steps a and b for subsequent acoustic information to form plural combined source signals; and d. averaging the plural combined source signals to form an averaged source-combined signal, and detecting target range information in the averaged source-combined signal.

4. The method of claim 3, wherein the step of averaging comprises ensemble averaging the plural combines source signals.

5. A method of acoustically locating objects, comprising:

detecting acoustic signals on plural beams;

correlating a first acoustic signal on a first beam with at least a second and third acoustic signal, respectively, on a second and third beam, respectively, of said plural beams to output a correlated second and third signal, respectively;

time-aligning the correlated second and third signals to form a time-aligned signal; and determining the location of an object along a path of the first beam based on the time-aligned signal.

6. The method of claim 5, wherein the correlating and time-aligning steps are repeated for further acoustic signals on the first, second and third beams to output further time-aligned signals, and the step of determining further comprises averaging the time-aligned and further time-aligned signals to form an averaged source-combined signal, and detecting a value representing range of a target in the averaged source-combined signal.

7. The method of claim 6, wherein the step of correlating comprises cross-correlating, and the step of averaging comprises ensemble averaging.

8. A passive acoustic system for use in connection with acoustic information from multistatic sources reflected by at least one target received by an array of acoustic detectors, comprising:

a beam correlator operably coupled to receive the acoustic information from the plural acoustic detectors; and a time-aligned combiner operably coupled to the beam correlator, whereby the beam correlator and time-aligned combiner are operable to process the acoustic information to determine location information including a range to said at least one target.

9. The system of claim 8, further comprising an ensemble averager operably coupled to the combiner.

10. The system of claim 9, further comprising a display operably coupled to the ensemble averager.

11. A multistatic sonar system, comprising:

plural acoustic detectors operable for receiving acoustic information from multistatic sources reflected by at least one target;

a cross-correlator operably coupled to the plural acoustic detectors for cross-correlating a target beam with plural source beams to form plural target-source cross-correlated signals;

a time-aligned combiner operably coupled to the cross-correlator; and a location detector operably coupled to the time-aligned combiner, whereby the cross-correlator, time-aligned combiner and location detector are operable to process the acoustic information to determine location information including a range to said at least one target.

12. The system of claim 11, wherein the time-aligned combiner is operably coupled to the cross-correlator for time aligning the plural target-source cross-correlated signals to form a source combined signal; and the location detector further comprises a range detector for detecting and outputting a value representative of a target range based on the source combined signal.

* * * * *

UNITED STATES PATENT AND TRADEMARK OFFICE
CERTIFICATE OF CORRECTION

PATENT NO. : 6,661,740 B1
DATED : December 9, 2003
INVENTOR(S) : Ben. R. Breed and William Lee Mahood It is certified that error appears in the above-identified patent and that said Letters Patent is hereby corrected as shown below:

<u>Column 4,</u>
Line 15, after "array 13," insert -- the --
Line 16, after "of the", delete "of the"

<u>Column 5,</u>
Line 1, after "product of the", delete "of the"

Signed and Sealed this

Twenty-fourth Day of February, 2004

JON W. DUDAS
*Acting Director of the United States Patent and Trademark Office*